July 3, 1962  L. J. O'BRIEN  3,041,890
FRAME TYPE AXLE
Filed April 13, 1960
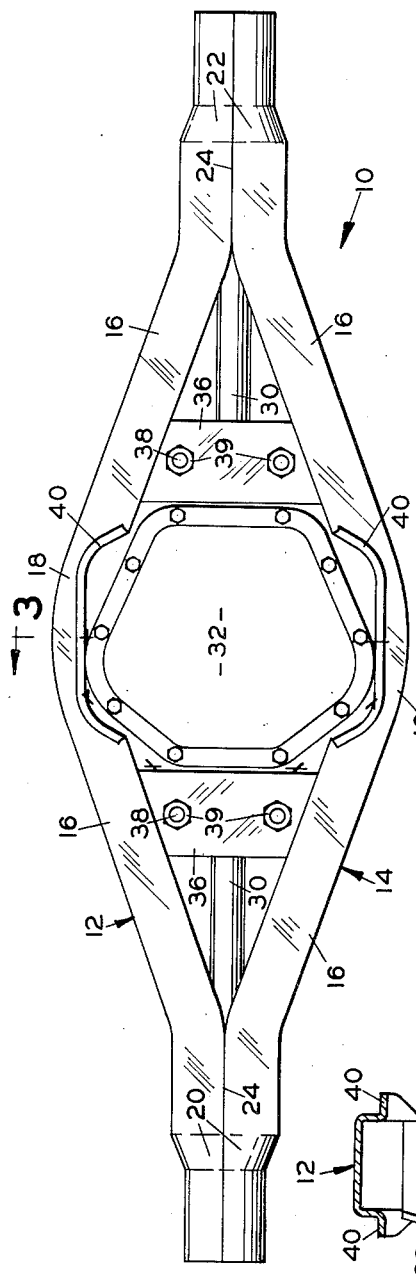
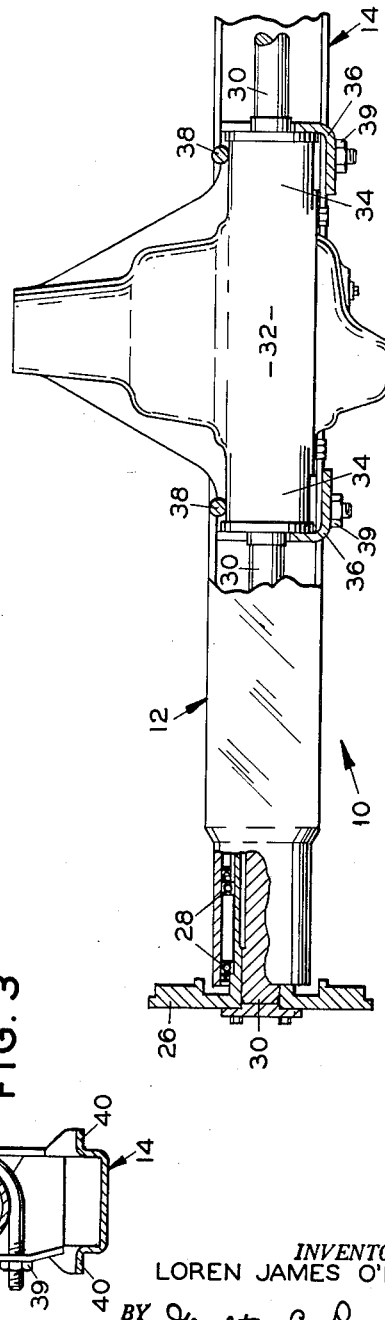
INVENTOR.
LOREN JAMES O'BRIEN
BY Walter E. Pawlick
ATTORNEY 3,041,890
FRAME TYPE AXLE
Loren J. O'Brien, Grabill, Ind., assignor to Dana Corporation, Toledo, Ohio, a corporation of Virginia
Filed Apr. 13, 1960, Ser. No. 21,974
1 Claim. (Cl. 74—607)

This invention relates to improvements in axles for motor vehicles in general, and is particularly directed to an improved rear axle construction which is associated with the driving mechanism for the rear or traction wheels of such a vehicle.

A primary object of this invention is to provide an improved axle frame and differential gear housing arrangement.

In one preferred embodiment of this invention the frame includes upper and lower members which are spaced apart or bowed at their medial portion and have their ends secured to each other to directly receive wheel support means or wheel spindles. A gear housing is positioned between the medial portions of the upper and lower members and has a pair of shafts extending outwardly from the sides thereof and between the upper and lower members for transmitting power to the wheels. The gear housing is appropriately suspended between the upper and lower members so that the power transmitting mechanism is not subject to loads imposed on the frame. Hence, by separating the frame and the driving mechanism, the frame can be substantially overloaded without affecting the driving mechanism.

A further object of this invention is to separate the wheel bearings from the power transmitting mechanism so that loads on the wheel bearings are not directly imposed on the power transmitting mechanism.

A further object of this invention is to provide an axle assembly which is simple to service. This is accomplished with the present invention since the differential unit can be replaced by merely pulling the axle shafts and removing two U-bolts. Furthermore, the gear housing portion does not have to be disassembled to replace the frame, the gears and bearings in the gear housing are protected from damage, and the labor and material replacement costs are reduced.

A further object of this invention is to produce an axle in which the wheel bearing housings and the gear housings are entirely separated so that there is no danger of the wheel bearing grease being washed out by the axle gear lubricant.

A still further object of this invention is to provide an inexpensive frame and gear housing arrangement wherein a structure relatively small in size is adapted to carry maximum loads.

Further objects and advantages of this invention will become apparent upon reading the following detailed specification taken together with the accompanying drawings which form a part hereof.

In the drawings:

FIG. 1 is a rear elevation view of a frame and gear housing arrangement embodying this invention;

FIG. 2 is a plan view partially in section of the frame and gear housing arrangement illustrated in FIG. 1; and FIG. 3 is a cross section taken substantially along line 3—3 of FIG. 1.

The move toward the use of higher engine power in trucks, as illustrated by the current state of the automotive industry, is leading to the overloading of these vehicles generally, and especially those in the one-half to one ton size. Trucks of this size are sold mostly to farmers and small contractors who use these vehicles for a variety of purposes. These users pay little or no attention to the rated capacity of the vehicle, but will load the vehicle with as much cargo as it will bear. The only limits to this overloading are space and engine capacity. The small truck suppliers have magnified this overloading of the vehicle by increasing the size of the cargo box, for example, from six feet to eight feet, on the one-half ton pick-up, to meet the demand for increase of cargo space for use with the higher engine power vehicles.

In considering the problem of vehicle overloading, a much larger axle than those presently employed should be used to put the axle capacity on a par with the vehicle capacity. The use of a larger axle, however, would materially increase the size and cost of the vehicle to a point where it becomes a larger, more expensive and, consequently, less popular truck. Further, it is not deemed practical to increase the size and cost of all small trucks to accommodate those which are overloaded.

Many constructions and arrangements of rear axles have previously been used in connection with small trucks. A common construction consists of two similar channel-shaped stampings, bowed at their mid-points, and welded together at their ends. The relatively straight end portions are formed circular in shape and carry wheel spindles at their outermost ends. As is well understood, the enlarged central portion or "banjo frame" provides space for housing the differential mechanism and is closed by suitable cover members, one of which forms a support for the differential mechanism. In this instance the channels together with the cover members form the actual differential housing and thus vehicle loads are transmitted by the channels to the power transmitting mechanism which must then be designed to withstand such loads.

In the structure disclosed herein, the frame is separate from the differential housing, and merely supports it. Therefore, loads upon the frame will not be imposed on the differential housing and power transmitting mechanism.

Referring now to the drawings and more particularly FIG. 1, the axle frame 10 consists of a pair of elongated oppositely facing channel members 12 and 14. Channel member 12 is positioned above channel member 14 and each channel has a pair of substantially parallel legs 16 extending inwardly toward the other. Channel members 12 and 14 are bowed or spaced apart most widely at their medial portion 18. The channel members 12 and 14 are joined together at their ends 20 and 22 by any suitable means such as welds at the meeting edges 24 of the channel members.

The extreme ends of the channel members 12 and 14 are rounded, sized and adapted to receive suitable wheel supporting means or spindles. As shown in FIG. 2, the wheel support means takes the form of a flanged sleeve member 26 which has the sleeve portion thereof rotatably mounted within the extreme end portion of channel members 12 and 14 by bearings 28. The flanged sleeve member 26 is internally splined to receive mating splines of a power or axle shaft 30. The axle shaft 30 extends between the channels 12 and 14 and outwardly from a differential or gear housing 32, which is positioned between the upper and lower channels 12 and 14. The gear housing 32 is provided with opposed bosses 34 which rotatably support the inner ends of axle shafts 30. Thus, it is apparent that power is transmitted from the gears (not shown) within gear housing 32 to the axle shafts 30 and consequently to wheel supports 26.

Means is provided for suspending the gear housing 32 between the upper and lower channel members 12 and 14 so that the power transmitting mechanism is not affected by loads imposed on the axle frame. More particularly, a pair of struts 36 extend between the channel members 12 and 14 on either side the gear housing 32 and have their ends suitably secured to the inwardly extending legs 16 of channel members 12 and 14. Each strut 36 is provided with a pair of apertures which receive the ends of a U-bolt 38. Each U-bolt 38 extends around a boss 34 of the gear housing 32 to mount the same and is fixedly secured to its respective strut by nuts 39.

The central portion of the channel members 12 and 14 are provided with longitudinally extending arcuate flange portions 40 to accommodate the gear housing 32 and further strengthen the axle frame 10.

It is apparent that loads imposed on the axle frame 10 will be transmitted directly by the channel members 12 and 14 to the wheel mounting means. Since the gear housing 32 is merely suspended between the channel members 12 and 14 by U-bolts 38, power is transmitted from the gear housing 32 through axle shafts 30 to the wheel mounting means without being subject to loads imposed on the axle frame. With this arrangement, loads on the axle frame 10 may be substantially increased without increasing the size or strength of the axle shafts or other power transmitting elements.

The preferred embodiment of the invention has been illustrated and described, but changes and modifications can be made, and it is understood that this showing and description is illustrative only and not for the purpose of rendering this invention limited to the details illustrated or described, except insofar as the invention is limited by the terms of the following claim.

I claim:

In a vehicle having wheel supports the combination comprising, an axle frame including upper and lower inwardly facing channel members spaced apart most widely at their medial portions and converging at their ends, each of said channel members having inwardly extending legs, which legs in the medial portion of said channel members are provided with a flanged portion thereby strengthening said members, the ends of said upper and lower channel members being fixedly connected and rounded thereby being adapted to receive wheel supports, a gear housing positioned between the medial portions of said channel members, and having opposed bosses thereon, a pair of shafts, with one being disposed in each of said bosses and extending outwardly from said gear housing and between said upper and lower channel members for transmitting power to the wheel supports, means suspending said gear housing between the medial portion of said upper and lower channel members including a pair of struts positioned on the sides of said gear housing and each strut having the ends thereof attached to inwardly extending legs of said channel members and reinforcing the same, a U-bolt carried by each of said struts and extending around a boss of said gear housing whereby power is transmitted from the gear housing through said shafts to the wheel supports independently of the loads imposed on said frame.

References Cited in the file of this patent

UNITED STATES PATENTS

| 421,902 | Britz | Feb. 25, 1890 |
| 648,210 | Kidder | Apr. 24, 1900 |
| 1,367,927 | Stephens | Feb. 8, 1921 |
| 1,377,685 | Hotchkiss et al. | May 10, 1921 |
| 2,674,783 | Schneider et al. | Apr. 13, 1954 |

FOREIGN PATENTS

| 376,407 | France | June 11, 1907 |